July 23, 1946.  C. J. CHUNN  2,404,473
CUSHIONED CLIP
Filed May 23, 1944
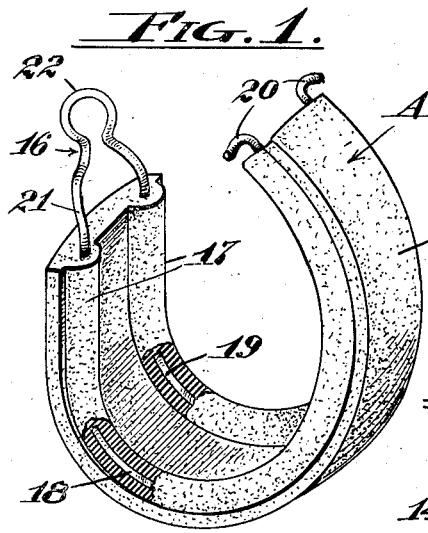
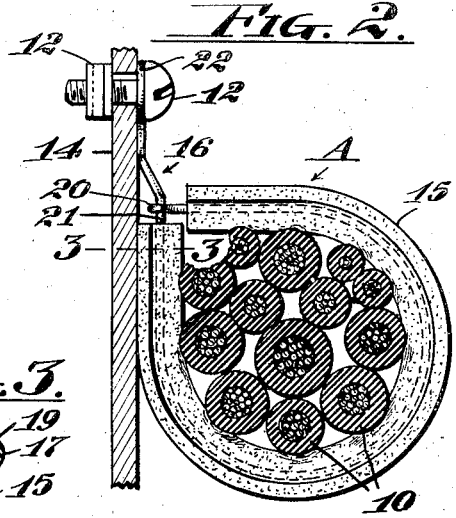
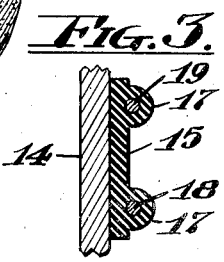
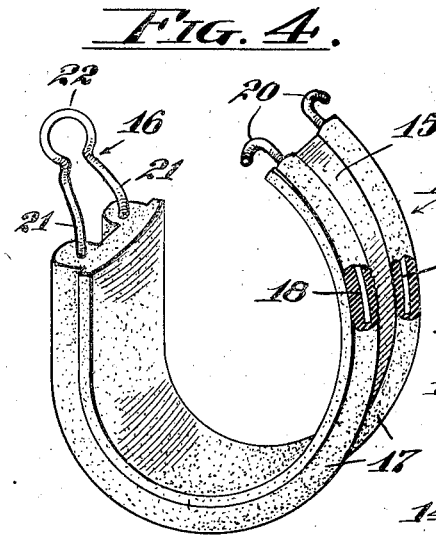
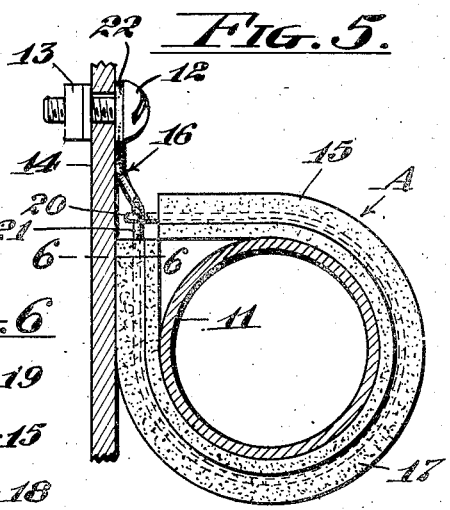
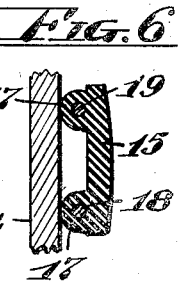
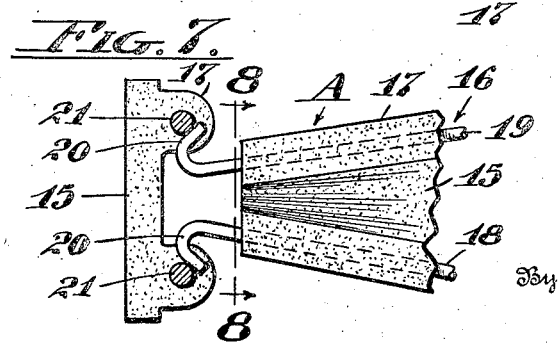
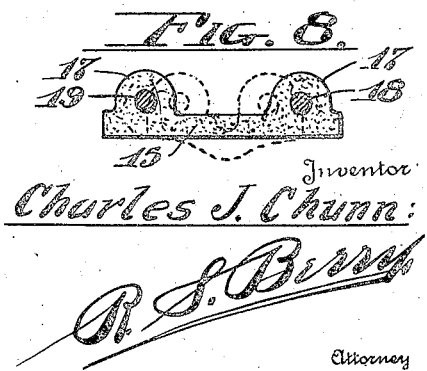
Inventor
Charles J. Chunn
By R. S. Birrey
Attorney Patented July 23, 1946

2,404,473

UNITED STATES PATENT OFFICE 2,404,473

CUSHIONED CLIP

Charles J. Chunn, Sierra Madre, Calif., assignor to Adel Precision Products Corp., Burbank, Calif., a corporation of California Application May 23, 1944, Serial No. 537,011

10 Claims. (Cl. 248—74)

This invention relates to cushioned clips for supporting wire or conduit lines, particularly in aircraft where it is the practice to secure various wire and conduit lines to structural parts past and adjacent which parts such lines are extended, in order that the lines will be supported and held in the desired out-of-the-way position and protected against chafing, damage and derangement.

An object of the invention is to provide a clip of the character described in which a yieldable and flexible cushion strip of itself unsuited to use as a clip, and a wire, are constructed and combined in a particular manner to form a composite, form-retaining loop which is well suited for advantageous use as a supporting clip in that it has adequate strength and durability, requires less metal and cushion material, is lighter as to weight, more flexible, easier to manufacture and install and subject to production at lower cost than cushioned clips as heretofore made, particularly a clip in which the loop is made of strap metal and lined with a cushion strip having rebent flanges to hold the strip on the loop.

Another object of my invention is to provide a clip such as described which may be readily clamped around the wires or conduit before or after affixation to the support and readily opened in either case to replace, remove or install the wires or conduit.

A further object is to provide a clip such as described in which a single resilient wire and a cushion strip of soft elastic rubber or the like are so constructed and combined as to form a readily applicable clamping and supporting loop having a high degree of cushioning and vibration dampening action as well as strength and durability.

Another object is to provide a clip of the character described in which a normally open loop formed of soft cushioning material is reinforced by a wire having end portions which protrude from the ends of the loop and are constructed and arranged as coacting fastening elements for interlocking and holding the loop closed and clamped on the wires or conduit when the end portions are brought together either before or after the mounting of clip on the support, thereby facilitating the installation of the clip.

A further object is to provide a clip such as described in which one end portion of the wire is formed so that the clip may be quickly and easily mounted on a screw or bolt carried by the support for the clip, either before or after the two end portions of the wire are locked together, said end formation also making it possible to insert the fastening screw or bolt therethrough to secure it to the support before or after locking the ends together, whereby the different modes of installation thus afforded make it possible to readily install the clip in the manner best suited to the particular support or particular installation space available.

Another object is to provide clip of the character described in which a spring wire and a cushion strip of the nature described are constructed and combined so that the ends of the wire protruding from the ends of the cushion provide a snap fastening means which will interlock with a snap action on the forcing of said ends together, and wherein the spring wire adds to the cushioning and vibration dampening action of the clip.

With the foregoing objects in view together with such other objects and advantages as may subsequently appear the invention resides in the parts and in the combination construction and arrangement of parts as hereinafter described and claimed, and as illustrated by way of example in the accompanying drawing in which:

Fig. 1 is a perspective view of a clip embodying my invention:

Fig. 2 is a vertical sectional view of the clip as it would appear when installed to support a group or bundle of wires:

Fig. 3 is a cross sectional view taken on the line 3—3 of Fig. 2:

Fig. 4 is a perspective view of a modified form of clip embodying my invention:

Fig. 5 is a vertical sectional view of the clip shown in Fig. 4 as it would appear when installed to support a conduit:

Fig. 6 is a sectional view taken on the line 6—6 of Fig. 5:

Fig. 7 is a fragmentary view partly in top plan and partly in horizontal section showing the manner in which the end portions will snap past one another into interlocked relation:

Fig. 8 is a sectional view taken on the line 8—8 of Fig. 7 showing how the clip is transversely compressed and expanded in the operation of interlocking the ends thereof in the manner shown in Fig. 7.

The embodiment of my invention shown in the accompanying drawing comprises a clip including an open loop generally designated A adapted to embrace a group of wires 10 as shown in Fig. 2, or a conduit 11 as shown in Fig. 5 and to be secured by means of a bolt 12 and a nut 13 to a support 14.

It has been the practice in this art to form the clip of a resilient metal strap bent to provide a normally open loop having outwardly extended end portions which are forced together to close the loop and clamp it around wires or a conduit, at least one of said end portions affording the mounting of the clip to a support. Usually these clips have their strap metal loops lined with cushion strips of rubber or the like for embracing and protecting the wires or conduit. In some instances the end portions of the loops of these clips are provided with interlocking elements or hooks to hold the loops closed around the wires.

In order to conserve metal, reduce weight, increase flexibility and the cushioning action and reduce the cost of manufacture and installation of a conduit or wire embracing clip of the type heretofore used, the loop A of my improved clip is primarily made of a cushion strip 15 which is yieldable and flexible, but of itself not suited to use as a supporting loop, which is reinforced and made form-retaining by means of a wire 16, the cushion strip being of no greater extent than those heretofore used, and in fact, being produced with less cushioning material and having less bulk than the rebent flange types of cushions heretofore employed. The cushion strip is preferably made of soft rubber or synthetic rubber and is somewhat elastic, but could be made of any yieldable and flexible cushion material. The wire 16 is made of considerably less metal than the aforesaid metal strap, is much lighter, has less bulk and is appreciably reduced as to weight. The wire 16 should be of such stiffness as to make the loop form-retaining and bendable, and preferably, but not necessarily, resilient. However, spring wire may be used, and in such case the form-retaining and cushioning qualities of the loop are increased and the loop has a decided spring action.

As here provided the loop A of cushioning material is maintained in the desired open loop form by the formation of the wire 16 and the manner in which it is combined with the cushion strip. The wire extends longitudinally of the cushion so as to be covered thereby and may be embedded therein or in any manner united therewith provided it is inseparably combined therewith and covered thereby except beyond the ends of the cushion, where portions of the wire, as will be hereinafter described, form "end" portions affording the holding of the loop closed and the mounting of the loop on the support 14.

In the present instance the cushion strip is provided with integral tubular cushioning ribs 17 extending longitudinally thereof and the wire is bent or doubled intermediate its ends to form a pair of circular, open and parallel loop portions 18 and 19 which are mounted in the tubular ribs. The wire may be first bent into hair-pin shape so that its two legs which are to form the loop portions may be extended through the tubular ribs, after which the legs are bent to form the two loop portions which therefore bring the cushion into and maintain it in corresponding loop formation as shown in Fig. 1, or the wire may be first bent to form the loops and then inserted through the ribs 17.

The free ends of the wire 16 are formed as hooks 20 extended outwardly from one end of the cushion. The other or doubled end portions 21 of the wire are likewise extended outwardly from the other end of the cushion and bent to form an open eye 22 for reception of the screw 12. The end portions 21 have offsetting bends whereby the eye 22 is offset to engage the support 14 as shown in Fig. 2 and permit of an easy hooking of the hooks 20 around the end portions 21 as shown in Fig. 2, as well as a ready unhooking action.

It should be noted that the loop A may be clamped around the wires or the conduit either before or after the clip is mounted on the support. This is accomplished by forcing the hooks 20 against the end portions 21 as shown in Fig. 7, so that said hooks will snap past said end portions and hook thereto. When the "ends" of the loop are thus interlockingly engaged the open eye 22 may be pulled against the bolt 12 after the latter is mounted on the support, so that the bolt will snap into the eye and may be quickly tightened to hold the clip in place. On loosening the bolt the clip may be removed therefrom. When the bolt is tight, the hooks 20 may be disengaged from the end portions 21 so that the loop will spring open for the purpose of removing or replacing wires or the conduit.

It should be noted that the loop A may be formed with the ribs 23 of the cushion strip 15 disposed on the inner face of the loop as shown in Figs. 1, 2 and 3, or upon the outer face of the loop as shown in Figs. 4, 5 and 6, there being an effective cushioning action with either arrangement of the ribs. Preferably the ribs 17 are formed to extend adjacent the longitudinal or side margins of the cushion strip. The wire loops 18 and 19 may be spaced apart a distance less than the space between the bores of the tubular ribs so that said wire loops especially if made of spring wire will exert a force to draw the ribs toward one another thereby giving the cushion strip a convex formation in cross section and enhancing the cushioning action.

When the hooks 20 are forced against the end portions 21 as shown in Fig. 7, the relatively thin and flexible portion of the cushion between the ribs will be folded and compressed as shown in Figs. 7 and 8 as said hooks are forced toward one another so that once past the portions 21 they will snap into hooked engagement with them. The cushion strip in springing back to normal shape aids in this action and together with the spring wire loops causes a tensioned interlocking of the "ends" of the loop.

The cushion may be made of felt or some other similar cushioning material which need not be rubber-like or elastic. However a soft and elastic rubber or synthetic rubber cushion may be used with spring or other wire and will provide a most effective clamping loop in accordance with this invention. The main requirements as to the wire and cushion as here combined are that the wire must have sufficient stiffness to give a cushion strip of yieldable flexible material sufficient strength and form retaining qualities to provide a loop as here shown for securely holding the wires or conduit in place and at the same time the wire must provide end formations affording the fastening of the loop to a support and preferably the detachable fastening of the ends of the loop together in the manner here shown.

While I have shown and described specific embodiments of my invention I do not limit myself to the exact details of construction set forth, and the invention embraces such changes, modifications and equivalents of the parts and their formation and arrangement as come within the purview of the appended claims.

I claim:

1. In a clip for supporting wires or a conduit, a strip of flexible cushioning material adapted to form an open loop for embracing and supporting wires or a conduit, and a spring reinforcing and form-retaining wire combined with said strip and formed so as to maintain the strip in the form of a tensioned loop having normally spaced apart ends adapted to be brought together to close the loop and clamp it around the wires or a conduit.

2. In a clip for supporting wires or a conduit, a strip of flexible cushioning material adapted to form an open loop for embracing and supporting wires or a conduit, and a reinforcing and form-retaining wire combined with said strip and formed so as to maintain the strip in the form of a loop having normally spaced apart ends adapted to be brought together to close the loop and clamp it around the wires or a conduit, and an end portion of said wire extending beyond an end of said strip and adapted to be secured to a support to fasten the clip thereto.

3. In a clip for supporting wires or a conduit, a strip of flexible cushioning material adapted to form an open loop for embracing and supporting wires or a conduit, and a reinforcing and form-retaining wire combined with said strip and formed so as to maintain the strip in the form of a loop having normally spaced apart ends adapted to be brought together to close the loop and clamp it around the wires or a conduit, a portion of said wire extending beyond an end of the strip and bent to form an eye for reception of a fastening to secure the clip to a support, and hook means formed by offset terminal bending of said wire and extending beyond the other end of said strip and adapted to be hooked to said portion of the wire to secure the ends of the loop together to close the loop and clamp it around the wires or conduit, said hook means and eye preventing the removal of the aforesaid strip of cushioning material from said wire.

4. In a clip for supporting wires or a conduit, a strip of flexible cushioning material adapted to form an open loop for embracing and supporting wires or a conduit, and a reinforcing and form-retaining wire combined with said strip and formed so as to maintain the strip in the form of a loop having normally spaced apart ends adapted to be brought together to close the loop and clamp it around the wires or a conduit, said wire extending along the strip so as to be covered thereby to prevent contact of the wire with the wire or conduit supported in the loop.

5. In a clip for supporting wires or a conduit, a strip of flexible cushioning material adapted to form an open loop for embracing and supporting wires or a conduit, and a reinforcing and form-retaining wire combined with said strip and formed so as to maintain the strip in the form of a loop having normally spaced apart ends adapted to be brought together to close the loop and clamp it around the wires or a conduit, and at least one tubular cushioning rib formed on said strip, said wire being extended through said tubular rib and projecting from each of its ends, the projecting end portions of said wire being so contoured as to prevent its withdrawal from said strip.

6. In a clip for supporting wires or a conduit, a strip of flexible cushioning material adapted to form an open loop for embracing and supporting wires or a conduit, and a reinforcing and form-retaining wire combined with said strip and formed so as to maintain the strip in the form of a loop having normally spaced apart ends adapted to be brought together to close the loop and clamp it around the wires or a conduit, said wire being bent to form a plurality of open and substantially circular loops.

7. In a clip for supporting wires or a conduit, a strip of flexible cushioning material adapted to form an open loop for embracing and supporting wires or a conduit, and a reinforcing and form-retaining wire combined with said strip and formed so as to maintain the strip in the form of a loop having normally spaced apart ends adapted to be brought together to close the loop and clamp it around the wires or a conduit, said wire being bent to form a pair of open loops lying in spaced substantially parallel relation within the strip, and tubular cushioning ribs on said strip in which ribs said loops are mounted.

8. In a clip for supporting wires or a conduit, a strip of flexible cushioning material adapted to form an open loop for embracing and supporting wires or a conduit, and a reinforcing and form-retaining wire combined with said strip and formed so as to maintain the strip in the form of a loop having normally spaced apart ends adapted to be brought together to close the loop and clamp it around the wires or a conduit, said wire being bent to form a pair of open loops lying in spaced substantially parallel relation within the strip, and tubular cushioning ribs on said strip in which ribs said loops are mounted, a doubled portion of said wire extended from one end of the strap forming at its outer end an open eye for reception of a fastening for securing the clip to a support, and hooks on the free ends of said wire extending from the other end of the strip, and adapted to be hooked onto said doubled portion at a point between the eye and the adjacent end of the strip.

9. In a clip for supporting wires or a conduit, a strip of flexible cushioning material adapted to form an open loop for embracing and supporting wires or a conduit, and a reinforcing and form-retaining wire combined with said strip and formed so as to maintain the strip in the form of a loop having normally spaced apart ends adapted to be brought together to close the loop and clamp it around the wires or a conduit, said wire being bent to form a pair of open loops lying in spaced substantially parallel relation within the strip, and tubular cushioning ribs on said strip in which ribs said loops are mounted, a doubled portion of said wire extended from one end of the strip forming at its outer end an open eye for reception of a fastening for securing the clip to a support, and hooks on the free ends of said wire extending from the other end of the strip, and adapted to be hooked onto said doubled portion at a point between the eye and the adjacent end of the strip, the material of said strip adjacent to said other end thereof between said ribs being sufficiently flexible to permit the lateral movement of the wires incident to their being hooked onto said doubled portion as aforesaid.

10. In a clip for supporting wires or a conduit, a strip of flexible cushioning material adapted to form an open loop for embracing and supporting wires or a conduit, and a reinforcing and form-retaining wire combined with said strip and formed so as to maintain the strip in the form of a loop having normally spaced apart ends adapted to be brought together to close the loop and clamp it around the wires or a conduit, said wire being bent to form a pair of open loops lying in spaced substantially parallel relation within the strip, and tubular cushioning ribs on said strip in which ribs said loops are mounted, a doubled portion of said wire extended from one end of the strap forming at its outer end an open eye for reception of a fastening for securing the clip to a support, and hooks on the free ends of said wire extending from the other end of the strip, and adapted to be hooked onto said doubled portion at a point between the eye and the adjacent end of the strip, said wire being resilient and stiff so that said hook ends will snap into hooking position on forcing the ends of the loop together.

CHARLES J. CHUNN.